Nov. 3, 1964    L. D. REEL    3,154,842
PIPE COUPLING CHUCK AND REMOVAL APPARATUS
Filed July 31, 1961

INVENTOR
Leo D. Reel
BY *Arnold and Roylance*
ATTORNEYS

United States Patent Office 3,154,842
Patented Nov. 3, 1964

3,154,842
PIPE COUPLING CHUCK AND REMOVAL
APPARATUS
Leo D. Reel, 625 West Bldg., Houston, Tex.
Filed July 31, 1961, Ser. No. 127,947
8 Claims. (Cl. 29—240)

This invention relates to apparatus for removing or separating two parts which are stuck together and, more particularly, to apparatus for removing or separating parts by rotating such parts relative to each other.

While not limited thereto, the invention finds particular application to the removal of pipe couplings stuck on drill pipe. In the oil well industry, it is common to secure adjacent sections of drill pipe together by means of a pipe coupling. It often happens that the pipe couplings are so tightly screwed onto the drill pipe sections or that the threads have become so damaged, corroded or otherwise defective that the coupling cannot be removed from the drill pipe by conventional tools normally employed for such purposes.

Accordingly, one of the objects of the invention is to provide new and improved apparatus for separating two parts stuck together.

Another object is to provide improved apparatus for separating two parts by producing relative rotation therebetween.

Still another object is to provide improved apparatus for removing a pipe coupling from a drill pipe.

A further object is to provide an improved chuck for gripping an object so that the object can be rotated to remove it from another part.

In order that the manner in which these and other objects are attained in accordance with the invention can be understood in detail, reference is had to the accompanying drawing, which forms a part of this specification, and wherein.

Figure 1:
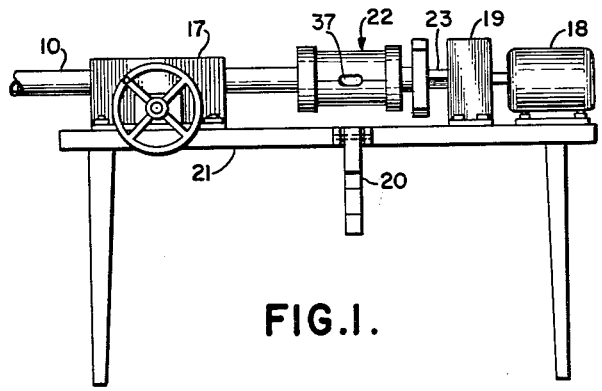
FIG. 1 is a side elevational view of one embodiment of the invention.
Figure 6:
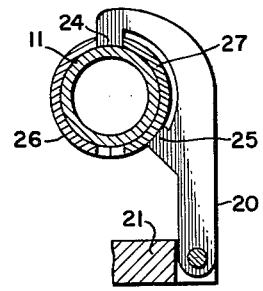
FIG. 6 is an elevational view with portions of the table and chuck in section, illustrating the operative position of the wrench of the embodiment of FIG. 1.

Referring now to the drawing, the embodiment of the invention there shown is for the purpose of separating a drill pipe 10 having a pipe coupling 11 stuck on one end, the drill pipe and pipe coupling being of the type commonly used in oil wells and being illustrated as removed from the bore of an oil well. Drill pipe 10 has an externally tapered threaded end 12 which is received in an internally threaded tapered end 13 of the pipe coupling. Pipe coupling 11 also has an internally threaded tapered end 14 which is adapted to be connected to another section of drill pipe for connecting the various sections together. The outside diameter of the pipe coupling is greater than that of the pipe. Further, the pipe coupling has a pair of flat end faces or shoulders 15 and 16 which lie in planes extending transversely of the axis of the coupling. It is assumed for the purpose of describing the invention that pipe coupling is stuck on the drill pipe and cannot be removed by using conventional tools normally employed for this purpose.

With reference to FIG. 1, the apparatus of the invention comprises a vise 17, a motor 18, a transmission 19, a wrench 20, a table 21 and a chuck 22. Vise 17 is mounted upon table 21 and can be of any conventional type operative to grip pipe 10 and support the pipe against rotation under the application to the pipe of a torque sufficient to loosen pipe coupling 11.

Motor 18 and transmission 19 are also mounted on table 21 in alignment with vise 17 and are operative to rotate a shaft 23 in either direction. The shaft has a square transverse cross section and is engageable with chuck 22, in a manner more fully described hereafter, for actuating the chuck to engage the pipe coupling and to disengage the chuck from the pipe coupling, when rotated in the proper direction. The transmission is of a type which reduces the speed and increases torque and also includes clutch means arranged to allow slippage in the event shaft 23 cannot be rotated. Such slippage is necessary since in some instances the pipe coupling may be so tightly stuck that it cannot be removed by the mere application of the output torque of shaft 23 thereto.

Wrench 20 is pivotally supported on table 21 for movement between a position in which it hangs downwardly from the table to the position in which it is engaged with chuck 22 positioned above the wrench. Wrench 20 is provided with a lug 24 adapted to be inserted in an aperture in chuck 22 and a lug 25 adapted to engage the outer surface of chuck 22 to prevent rotation of the chuck in one direction.

Figure 3:
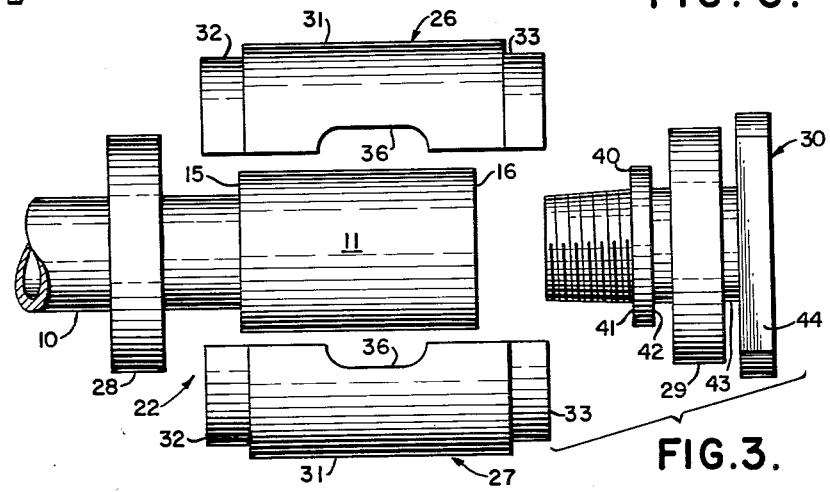
FIG. 3 is an exploded view useful in describing the manner in which the chuck is assembled.

Chuck 22 comprises a pair of elements 26 and 27, a pair of rings 28 and 29, and a member 30. Each of elements 26 and 27 is identical so that only one need be described in detail. With reference to element 26 and FIG. 3, each element has a semi-cylindrical main body portion 31 and semi-cylindrical end portions 32 and 33 of reduced radii. The inside radius of body portion 31 is substantially the same as or slightly greater than the outside radius of coupling 11 and, when engaged with the coupling, extends approximately 180 degrees around the coupling. The outside radius of each of end portions 32 and 33 is less than the outside radius of body portion 31 and the inside radii of portions 32 and 33 is less than the inside radius of portion 31. End portions 32 and 33 are provided with flat annular shoulders 34 and 35 which are opposed and lie in planes that extend transversely to the axis of the element. Shoulders 34 and 35 are spaced apart a distance greater than the length of coupling 11. The inner radius of each of shoulders 34 and 35 is less than the outer radius of the coupling so that, when chuck 22 is assembled, shoulder 34 is engageable with shoulder 15 and shoulder 35 is engageable with a shoulder formed on member 30, in a manner more fully described hereafter. Each of elements 26 and 27 is also provided with a pair of U-shaped recesses 36 which, when the chuck is assembled, cooperate to form a pair of apertures such as is indicated at 37 in FIG. 1 into which lug 24 of wrench 20 can be fitted.

When chuck 22 is assembled, elements 26 and 27 are clamped together so that end portions 32 and 33 form end portions of reduced diameter and so that the inner wall of body portions 31 forms a cylindrical chamber which encloses coupling 11. Advantageously, elements 26 and 27 can be formed by cutting a cylindrical blank in half. Furthermore, while only two elements are shown, each of which extends for approximately 180 degrees around the coupling, it will be obvious that more than two can be used. However, two elements are preferable because they are easier to handle and to manufacture.

Member 30 has a central bore 38 of a square cross section into which shaft 23 can be inserted for transmitting rotation and torque from the shaft to member 30. The dimensions of shaft 23 are slightly less than that of bore 38 so that member 30 can slide along the shaft. Member 30 has an externally threaded tapered end 39 which can be screwed into end 14 of coupling 11. Adjacent to end 39, member 30 has an outwardly extending flange 40 bounded on opposite sides with flat surfaces or shoulders 41 and 42 which lie in planes that extend transversely to the axis of member 30. The thickness of flange 40, i.e., the distance between shoulders 41 and 42, is less than the difference between the length of coupling 11 and the distance between shoulders 34 and 35 of elements 26 and 27 to provide a small clearance on the order of ⅛" for facilitating assembly and disassembly of the chuck. When the chuck is assembled, this amount of clearance is the distance that member 30 can move axially of coupling 11. Since coupling 11 is connected to member 30 by means of tapered threads, it is obvious that the clearance cannot be so great that within the small amount of movement the threads will become fully disengaged or partially disengaged to the extent that the cross section of the engaged threads will materially weaken the threads so that they cannot transmit the high forces necessary to actuate the chuck.

Figures 2, 5:
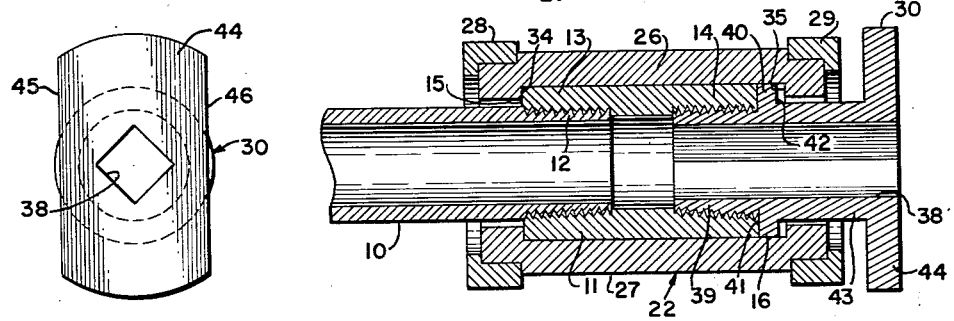
FIG. 2 is a longitudinal sectional view illustrating the structure of the chuck and its relationship to the parts being separated.
FIG. 5 is an end elevational view of another part of the chuck.
Figure 4:
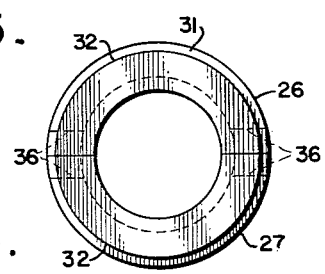
FIG. 4 is an end elevational view of parts of the chuck.

Member 30 also has a main body portion 43 of cylindrical outer configuration and a projection 44 which extends transversely and outwardly at one end of body portion 43. As shown in FIG. 5, projection 44 is provided with a pair of surfaces 45 and 46 which are exposed so that they can be struck with a sledge hammer to impart a shock or jarring force to aid in the removal of the coupling in the event that the torque from motor 18 and transmission 19 is insufficient to loosen the coupling.

In order to remove coupling 11 from pipe 10, member 30 is fitted over and slid onto shaft 23. Next, ring 29 is temporarily positioned on body portion 43. Pipe 10 and coupling 11 are then brought into position on the table and ring 28 is slid over coupling 11 and pipe 10 a short distance. Next, member 30 is fully screwed into coupling 11 so that shoulder 41 engages shoulder 16. Then, elements 26 and 27 are fitted over coupling 11 and rings 28 and 29 are fitted over end portions 32 and 33 to secure elements 26 and 27 together. Such an assembled condition of the chuck is shown in FIG. 2.

As shown in FIG. 2, the clearance exists between shoulders 42 and 35. However, it is to be understood that the clearance can also exist wholly between shoulders 15 and 34 or that it can be divided between the cooperating shoulders.

Next, motor 18 is operated to rotate shaft 23 in a direction tending to loosen coupling 11 from pipe 10. Since the pipe is stationary and the coupling is stuck thereon, such rotation causes member 30 to be rotated in a direction tending to unscrew it from coupling 11. This rotation of member 30 causes it to move axially, to the right as viewed in FIG. 2, until shoulders 15 and 34 and 35 and 42 are engaged. It should be noted that if, prior to such movement, shoulders 15 and 34 are not engaged due to the slight clearance provided, shoulder 42 will first engage shoulder 35 and slide elements 26 and 27 along coupling 11 until shoulders 15 and 34 become engaged.

When shoulders 15 and 34 and 35 and 42 are engaged, member 30 cannot be further rotated in the direction tending to loosen coupling 11 unless the coupling is actually loosened. After the shoulders are engaged, shaft 23 continues to impart a torque to member 30 which torque causes coupling 11 to be placed in compression between shoulder 34 and end 39. At the same time, elements 26 and 27 are placed in tension due to the axially directed forces acting upon shoulders 34 and 35. The forces acting upon coupling 11 cause sufficient frictional engagement between the coupling and member 30 and elements 26, 27, to impart to coupling 11 a torque tending to loosen the coupling from pipe 10. Under most circumstances, the developed torque loosens coupling 11. However, in the event that it does not, then projection 44 can be struck to impart a jarring force to aid in loosening the coupling.

After coupling 11 has been loosened, shaft 23 is rotated so that the coupling is disengaged from pipe 10. The chuck is then rotated so that wrench 20 can be engaged with one of apertures 37, the wrench being arranged so that it prevents rotation of the coupling in the direction opposite to that necessary to loosen the coupling. When shaft 23 is rotated in the reverse direction, member 30 is screwed back into coupling 11 until shoulders 15 and 34 and 42 and 35 become disengaged to the extent that elements 26 and 27 can be removed. After the shoulders have been disengaged, rings 28 and 29 are removed from elements 26 and 27 and elements 26 and 27 are removed from the coupling. Then, member 30 is unscrewed from the coupling to complete the operation.

While only one embodiment has been illustrated, it will be apparent to those skilled in the art that many changes can be made in the details and arrangement of parts without departing from the scope of the invention as defined in the appended claims.

What is claimed is:

1. In apparatus for removing a pipe coupling stuck on one end of a drill pipe, the combination of means adapted to engage said pipe and support the same to prevent rotation thereof, a plurality of arcuate chuck elements cooperable with each other to define a chamber adapted to enclose said coupling, said chamber having a length greater than the length of said coupling, each of said elements having at one end of said chamber a first inwardly extending shoulder engageable with the end of said coupling adjacent to said drill pipe and a second inwardly extending shoulder at the other end of said chamber, said second shoulders being axially spaced from the other end of said coupling, a member having an externally threaded portion adapted to be connected to the threaded portion of said coupling, said member further having an outwardly extending flange disposed between said second shoulders and said other end of said coupling, said flange being engageable with said second shoulders in response to the application of a torque tending to loosen said coupling from said pipe to apply axially directed gripping forces to said coupling for applying a torque to said coupling in a direction tending to loosen the same, and means to apply the torque to said member to loosen said coupling.

2. In apparatus for removing a pipe coupling stuck on a drill pipe, the combination of a plurality of chuck elements disposable adjacent each other and constructed to define a cylindrical chamber enclosing said coupling, said chamber being bounded at opposite ends by opposed shoulders spaced apart a distance greater than the length of said coupling, means for holding said chuck elements together, an actuating member including a threaded portion adapted to be connected to said coupling and first means defining a shoulder engageable with one of said opposed shoulders, said means being of a length less than the difference between the spacing of said opposed shoulders and the length of said coupling, second means for rotating said actuating member relative to said pipe in a direction tending to loosen said coupling, such rotation being operative to move said actuating member axially of said coupling until said shoulder of said actuating member engages said one shoulder and said other shoulder engages one end of said coupling, said second means being further operative to apply a torque to said actuating member in a direction tending to loosen said coupling, such torque causing said coupling to be axially compressed between said chuck elements and said actuating member.

3. Apparatus in accordance with claim 2 wherein said actuating member is provided with an exposed surface which can be struck to impart a jarring force to aid in the removal of said pipe coupling.

4. In an apparatus for removing a pipe coupling from a pipe, the combination of;
   a specimen engaging chuck having,
      an inturned end portion adapted for abutting engagement of a coupling shoulder,
      and drive train engaging means adapted for rotation of said chuck whereby abutment between said inturned end and said coupling shoulder will rotate said coupling relative to said pipe;
   means to drive said drive train engaging means;
   and means to secure said pipe from rotation.

5. In apparatus for removing a coupling stuck on one end of a pipe, the combination of;
   chuck means including a threaded portion adapted to be threaded into said coupling at one end,
   and shoulder means adapted to engage the other end of said coupling,
   said chuck means being adapted to abuttably engage said shoulder means with said other end of said coupling upon the application of torque thereto,
   means to hold said pipe against rotation,
   and means for rotating said chuck means relative to said pipe to loosen said coupling.

6. In apparatus for separating two elements stuck together, one of said elements being substantially cylindrical and having at one end a threaded portion, the combination of;
   a threaded member adapted to be connected to the threaded portion of said one element,
   a plurality of arcuate elements adapted to be fitted over said one element and having means engageable with the other end of said one element,
   means for securing said arcuate elements around said one element whereupon application of torque to said arcuate elements will effect abuttable engagement of said arcuate elements with said other end of said one element,
   and means for imparting to said member and said elements a torque in a direction tending to separate said stuck elements.

7. In apparatus for removing a pipe coupling from a pipe, the combination of;
   means adapted to engage and support said pipe against rotation;
   chuck means including a pair of semi-cylindrical elements cooperative with each other to enclose said coupling,
      each of said elements having a shoulder engageable with one end of said coupling,
      and a threaded member adapted to be connected to said coupling,
         said threaded member being adapted to engage said semi-cylindrical element shoulders adjacent the same end of said coupling and thereby effect the engagement of said semi-cylindrical element shoulders adjacent the opposite end of said coupling with the opposite end of said coupling whereby rotation of said threaded member imparts rotation of said coupling,
   and means for applying a torque to said chuck means to loosen said coupling from said pipe.

8. In apparatus for removing a pipe coupling stuck on one end of a pipe, the combination of;
   a vise adapted to engage said pipe and prevent rotation thereof;
   chuck means engageable with said coupling including a plurality of arcuate elements surrounding said coupling,
      ring means holding said elements together,
      and a threaded member adapted to be connected to said coupling and cooperative with said elements,
         said threaded member being adapted to engage the inturned end of each of said arcuate members adjacent thereto and thereby effect the abutment of the inturned end of each of said arcuate members at the opposite end of said coupling with the cooperating shoulder of said coupling whereby rotation of said threaded member imparts rotation to said coupling;
   and driving means operably connected for imparting to said chuck a torque sufficient to loosen said coupling.

References Cited in the file of this patent
UNITED STATES PATENTS

| | | |
|---|---|---|
| 1,353,600 | McBride | Sept. 21, 1920 |
| 1,492,466 | Jarmolowsky | Apr. 29, 1924 |
| 1,498,451 | Guttly | June 17, 1924 |
| 1,516,764 | Dickinson | Nov. 25, 1924 |
| 1,765,825 | Cork | June 24, 1930 |
| 1,818,626 | Johnston | Aug. 11, 1931 |
| 2,166,382 | Temple | July 18, 1939 |
| 2,518,009 | Hess | Aug. 8, 1950 |
| 2,678,217 | King | May 11, 1954 |
| 2,684,606 | Brawley | July 27, 1954 |
| 2,690,613 | Bishop | Oct. 5, 1954 |
| 2,709,385 | Alger | May 31, 1955 |
| 2,866,473 | Schutter | Dec. 30, 1958 |
| 2,878,026 | Pioch | Mar. 17, 1959 |
| 2,904,955 | Kreiter | Sept. 22, 1959 |
| 2,943,522 | Brase | July 5, 1960 |
| 2,976,943 | Curtis | Mar. 28, 1961 |